(12) United States Patent
Lane et al.

(10) Patent No.: US 7,607,507 B2
(45) Date of Patent: Oct. 27, 2009

(54) BICYCLE BOTTOM BRACKET ASSEMBLY

(75) Inventors: Timothy Saul Lane, Irvine, CA (US);
Jeffrey A. Soucek, Aliso Viejo, CA (US)

(73) Assignee: Felt Racing, LLC, Irvine, CA (US)

( * ) Notice: Subject to any disclaimer, the term of this patent is extended or adjusted under 35 U.S.C. 154(b) by 348 days.

(21) Appl. No.: 11/650,776

(22) Filed: Jan. 8, 2007

(65) Prior Publication Data
US 2008/0164673 A1 Jul. 10, 2008

(51) Int. Cl.
*B60K 17/30* (2006.01)
(52) U.S. Cl. .................................. 180/260; 384/545
(58) Field of Classification Search ............... 280/260, 280/256, 259; 74/594.1
See application file for complete search history.

(56) References Cited

U.S. PATENT DOCUMENTS

| | | | | |
|---|---|---|---|---|
| 4,398,434 | A * | 8/1983 | Kimura | 74/594.4 |
| 4,577,531 | A * | 3/1986 | Bergles | 192/217.4 |
| 4,810,040 | A * | 3/1989 | Chi | 301/110.5 |
| 5,095,770 | A | 3/1992 | Rader, III | |
| 5,335,928 | A * | 8/1994 | Pong et al. | 280/259 |
| 6,276,234 | B1 * | 8/2001 | Harrington | 74/594.3 |
| 6,435,726 | B1 * | 8/2002 | Chi | 384/545 |
| 6,889,992 | B2 | 5/2005 | Vroomen et al. | |
| 7,000,936 | B2 | 2/2006 | Schmider | |
| 7,104,562 | B2 | 9/2006 | Schmider et al. | |
| 7,234,373 | B2 * | 6/2007 | Yamanaka | 74/594.1 |
| 2002/0033586 | A1 | 3/2002 | Vroomen et al. | |
| 2003/0235356 | A1 * | 12/2003 | Jiang | 384/458 |
| 2007/0104405 | A1 * | 5/2007 | Lin | 384/545 |
| 2007/0151410 | A1 * | 7/2007 | Meggiolan | 74/594.1 |
| 2007/0295154 | A1 * | 12/2007 | D'Aluisio et al. | 74/594.1 |
| 2008/0035431 | A1 | 2/2008 | Vroomen et al. | |
| 2008/0036170 | A1 | 2/2008 | Vroomen et al. | |
| 2008/0036171 | A1 | 2/2008 | Vroomen et al. | |
| 2008/0054592 | A1 | 3/2008 | Vroomen et al. | |
| 2008/0054593 | A1 | 3/2008 | Vroomen et al. | |
| 2008/0056635 | A1 * | 3/2008 | Lee | 384/545 |
| 2008/0159678 | A1 * | 7/2008 | Lin | 384/545 |

OTHER PUBLICATIONS

Zinn, Lennard; "Zinn and the Art of Mountain Bike Maintenance"; Excerpt entitled "Types of Bottom Brackets"; Copyright 2005; pp. 191; 4th Edition; Published by VeloPress in the USA.

(Continued)

*Primary Examiner*—Lesley D Morris
*Assistant Examiner*—Tashiana Adams
(74) *Attorney, Agent, or Firm*—Stetina Brunda Garred & Brucker

(57) ABSTRACT

A bottom bracket assembly for a bicycle is provided. The bottom bracket assembly may comprise a left bearing, bottom bracket shell and a right bearing. The bottom bracket shell may be threadless and have beveled surfaces for mounting the left and right bearings onto the bottom bracket assembly. A spindle is inserted through the bottom bracket shell. Thereafter, the left and right bearings are preloaded to align the central axis of the spindle to the crankarm rotating axis such that the spindle or left and right crankarms do not wobble and yet do not bind when rotated.

16 Claims, 3 Drawing Sheets

OTHER PUBLICATIONS

Shimano, Inc.; "Technical Service Instructions;Front Chainwheel; FC-7800; FC-7803" 2 pages; Copyright Jun. 2005.
Ciclogic Industrial Co., Ltd.; "Bottom Brackets" pp. 1.
Tien Hsien Industries; Online Complete Headset Reference Guide; Version 7; Mar. 2004; pp. 1-6; http://fullspeedahead.com/downloads/headsetbook.pdf.
Profile Racing, Inc.; "Authentic Profile Racing Original 3-Piece Chromoly Crank Installation Guide"; Copyright 1997.
Bike-Pro Productions; Online article entitled "Mavic Bottom Bracket"; 3 Pages; Copyright 1996; http://www.bikepro.com/products/bottom_brackets/mavic.shtml.

* cited by examiner

BICYCLE BOTTOM BRACKET ASSEMBLY

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to a bicycle crank set and bottom bracket.

Most bottom brackets hold left and right bearings internally via a separate cup that is threaded into the bottom bracket shell itself. The separate cup either alone or in combination with the bottom bracket shell aligns the left and right bearings to a rotating axis of the crankarms. For example, one common type of bottom bracket is the Shimano-style cartridge bottom bracket. The cartridge bearings are inserted into the bottom bracket shell of the bicycle frame. Cups are threaded into opposed sides of the bottom bracket shell to hold the cartridge in place. There are two deficiencies in these types of bottom bracket shell assemblies. First, the threads of the bottom bracket shell increases the cost of manufacturing the bicycle frame. Second, the bearings must be sized to fit between the cups and the spindle rather than for bearing performance.

Another type of bottom bracket was recently introduced by Shimano wherein the left and right bearings are external to the bottom bracket shell. The left and right bearings are held in place with respect to the bottom bracket shell via a threaded cup threaded into the bottom bracket shell. Unfortunately, the threads formed in the bottom bracket shell increases the cost of manufacturing the bicycle frame and possibility of damage to bicycle during assembly.

To eliminate the threads in the bottom bracket shell, some manufacturers have press fit the left and right bearings internally into the left and right side portions of the bottom bracket shell. Unfortunately, these press fit systems are also susceptible to improper fit because the manufacturing tolerance required for press fits are difficult to achieve using standard bicycle frame building practices.

Accordingly, there is a need in the art for an improved bicycle bottom bracket.

BRIEF SUMMARY

The bottom bracket assembly discussed herein addresses the needs discussed above, discussed below and those that are known in the art. The bottom bracket assembly aligns a central axis of a spindle to a crankarm rotating axis defined by a bottom bracket shell via mating beveled surfaces in the bottom bracket shell, left and right bearings and optionally left and right compression collars. In particular, the left and right bearings may have beveled surfaces which mate with beveled surfaces on the opposed distal ends of the bottom bracket shell. Moreover, the left and right bearings may have beveled surfaces which mate with beveled surfaces formed in left and right compression collars. The spindle is mounted through the bottom bracket shell and made rotateable via the left and right bearings. The left and right bearings are preloaded and set such that the spindle may freely rotate and does not bind when rotated, and the spindle does not wobble with respect to the bottom bracket shell. The left and right crankarms may be attached to the distal end portion of the spindle and the opposed distal end portion of the spindle via methods known in the art, discussed herein or developed in the future.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
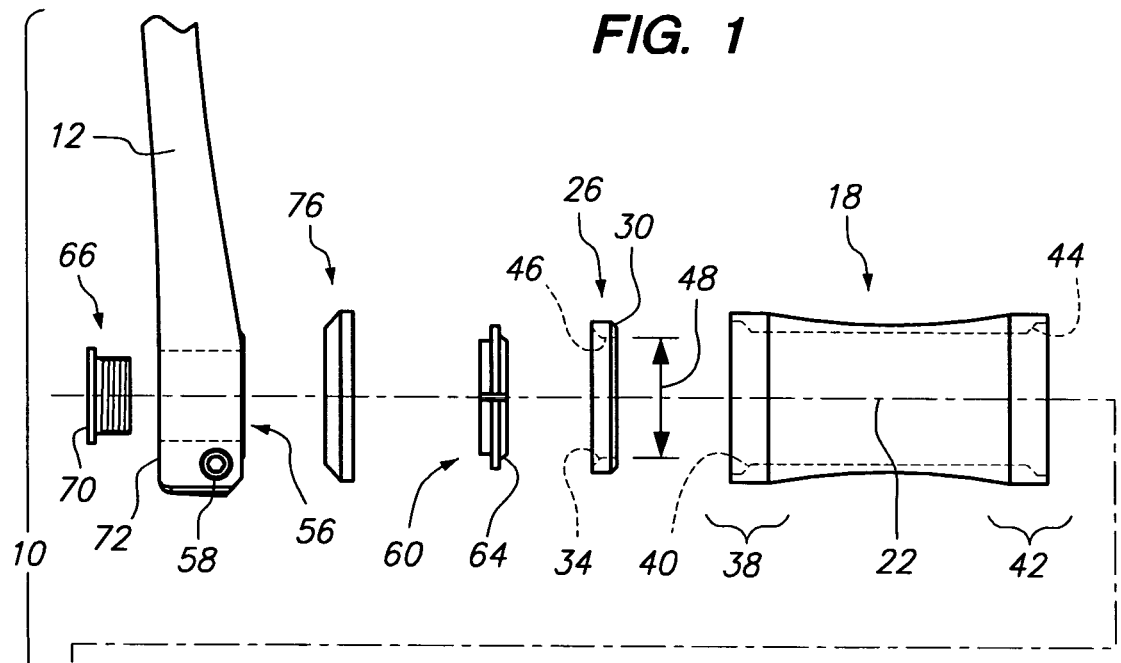
FIG. 1 is an exploded view of a first embodiment of a bicycle bottom bracket assembly.
Figure 1:
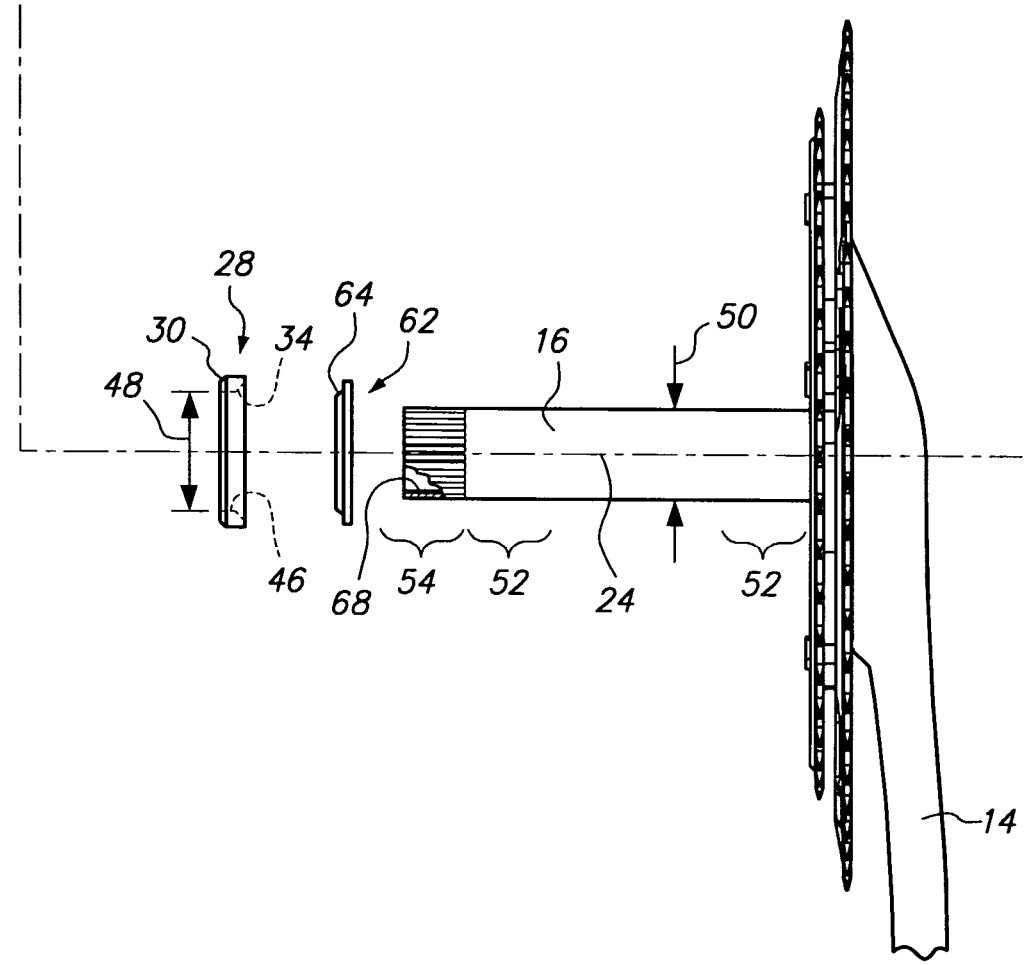

Referring now to the drawings, a bottom bracket assembly 10 is shown. The bottom bracket assembly 10 may comprise a non drive side crankarm or a left crankarm 12 and a drive side crankarm or a right crankarm 14. The bottom bracket assembly 10 may also comprise a spindle 16 attached to the right crankarm 14 and disposable within the bottom bracket shell 18 of a bicycle. The bottom bracket shell 18 defines a crankarm rotating axis 22. The spindle 16 defines a central axis 24. When the left and right crankarms 12, 14 are mounted on the bottom bracket shell 18, the central axis 24 of the spindle becomes aligned to the crankarm rotating axis 22.

The left and right crankarms 12, 14 are able to rotate about the crankarm rotating axis 22 via left and right bearings 26, 28 disposed between (1) the bottom bracket shell 18 and the left crankarm 12 and (2) the bottom bracket shell 18 and the right crankarm 14, respectively. The left and right bearings 26, 28 may be radial bearings, thrust bearings, angular contact bearings or any combination or multiplicity thereof. Preferably, the left and right bearings 26, 28 are angular contact bearings because they are very efficient at dealing with the angular forces exerted upon the left and right bearings 26, 28 while the user is exerting rotational forces on the left and right crankarms 12, 14 to propel the user forward on the bicycle.

Each of the left and right bearings 26, 28 may have a first external beveled surface 30 formed in an outer race. Each of the left and right bearings 26, 28 may also have an opposed second internal beveled surface 34 formed in an inner race.

The internal and external beveled surfaces 34, 30 of the left and right bearings 26, 28 assist in aligning the central axis 24 of the spindle 16 to the crankarm rotating axis 22. In particular, a left side portion 38 of the bottom bracket shell 18 may be formed with a first beveled surface 40 which mates with the first external beveled surface 30 of the left bearing 26. Likewise, the right side portion 42 of the bottom bracket shell 18 may be formed with a first beveled surface 44 which mates with the first external beveled surface 30 of the right bearing 28. To mount the left and right bearings 26, 28 onto the bottom bracket shell 18, the first external beveled surfaces 30 of the left and right bearings 26, 28 contact the first beveled surfaces 40, 44 of the left and right side portions 38, 42. Such contact between the beveled surfaces 30, 40, and 44 align the bearings 26, 28 to the crank arm rotating axis 22.

Mounting surfaces 46 of the left and right bearings 26, 28 may define an inner diameter 48 sized and configured to the outer diameter 50 of the mounting surfaces 52 of the spindle 16. The spindle 16 may be inserted through the right bearing 28, the bottom bracket shell 18 and the left bearing 26. After insertion, the mounting surfaces 46 of the left and right bearings 26, 28 contact respective mounting surfaces 52 formed on the spindle 16. There may be an appropriate fit (e.g., snug, friction, press, interference, etc.) between the mounting surfaces 52 of the spindle 16 and the mounting surfaces 46 of the left and right bearings 26, 28. As such, the central axis 24 of the spindle 16 may be aligned to the crankarm rotating axis 22. However, the left and right crankarms 12, 14 are not rotateably fixed to the bottom bracket shell 18 at this point.

Referring now to FIG. 1 illustrating a first embodiment, to rotateably fix the left and right crankarms 12, 14 to the bottom bracket shell 18, the left crankarm 12 may be attached to the distal end portion 54 of the spindle 16. In particular, the spindle 16 is inserted through the right bearing 28, the bottom bracket shell 18 and the left bearing 26. The distal end portion 54 of the spindle 16 protrudes out of the left bearing 26. The left crankarm 12 may have a split aperture 56 which may be compressed and fixedly engaged to the distal end portion 54 of the spindle 16 via a pinch bolt 58.

To further align the left and right bearings 26, 28 and the spindle 16 to the bottom bracket shell 18, an optional left compression collar 60 may be disposed between the left crank arm 12 and the left bearing 26. Likewise, an optional right compression collar 62 may be disposed between the right bearing 28 and the right crankarm 14. Each of the left and right compression collars 60, 62 may define second beveled surfaces 64 which mate with respective second internal beveled surfaces 34 of the left and right bearings 26, 28.

To complete the mounting of the left and right crankarms 12, 14 on the bottom bracket shell 18, the left and right bearings 26, 28 are preloaded on the bottom bracket shell 18. In particular, the spindle 16 is inserted through the right compression collar 62, the right bearing 28, the bottom bracket shell 18, the left bearing 26 and the left compression collar 60. The distal end portion 54 of the spindle 16 protrudes out of the left compression collar 60. The distal end portion 54 of the spindle 16 is inserted into the split aperture 56 of the left crankarm 12. To preload the left and right bearings 26, 28, the left and right crankarms 12, 14 are drawn closer to each other. In particular, an adjustment screw 66 may be threaded into internal threads 68 formed in the distal end portion 54 of the spindle 16. The adjustment screw 66 may have a flange 70 which mates with the outer side 72 of the left crank arm 22. As the adjustment screw 66 is threaded into the internal threads 68 of the distal end portion 54, the flange 70 pushes the left crank arm 12 closer to the right crankarm 14 and the right crankarm 14 is drawn closer to the left crankarm 12. The left and right bearings 26, 28 are preloaded until the left and right crankarms 12, 14 are able to freely rotate about the crankarm rotating axis 22 and not wobble with respect to the bottom bracket shell 18 (i.e., the central axis 24 of the spindle 16 is aligned to the crankarm rotating axis 22). After the proper amount of preload is applied to the left and right bearings 26, 28, the pinch bolt 58 is tightened such that the split aperture 56 of the left crankarm 12 is fixedly engaged to the distal end portion 54 of the spindle 16. To prevent the left crankarm 12 from rotationally slipping on the distal end portion 54 of the spindle, the distal end portion 54 of the spindle 16 may optionally be splined. The inner surface 74 of the split aperture 56 may also be splined so as to mate with the splined distal end portion 54 of the spindle 16.

After the left and right bearings 26, 28 are preloaded into the bottom bracket shell 18, the second beveled surfaces 64 of the left and right compression collars 60, 62, the second internal beveled surfaces 34 of the left and right bearings 26, 28, the first external beveled surfaces 30 of the left and right bearings 26, 28 and the first beveled surfaces 40, 44 of the left and right side portions 38, 42 of the bottom bracket shell 18 are respectively placed in contact with each other so as to align the central axis 24 of the spindle 16 to the crankarm rotating axis 22.

An optional dust cap 76 may be sized and configured to cover the left compression collar 60 and the left bearing 26. The dust cap 76 may be disposed between the left compression collar 60 and the left crankarm 12.

In an aspect of the embodiment shown in FIG. 1, it is contemplated that the left crankarm 12, right crankarm 14, and spindle 16 is an integrated-spindle with external-bearing crankset set up manufactured by Shimano.

Figure 2:
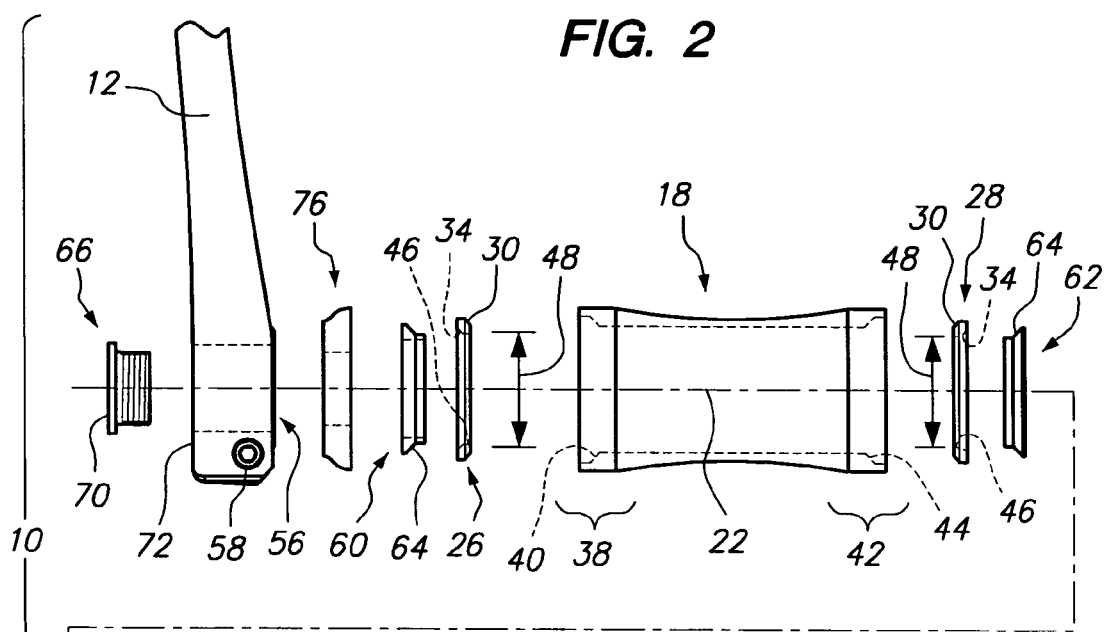
FIG. 2 is an exploded view of the bicycle bottom bracket assembly shown in FIG. 1 but modified such that a drive side crank arm is removeably attachable to a spindle.
Figure 2:
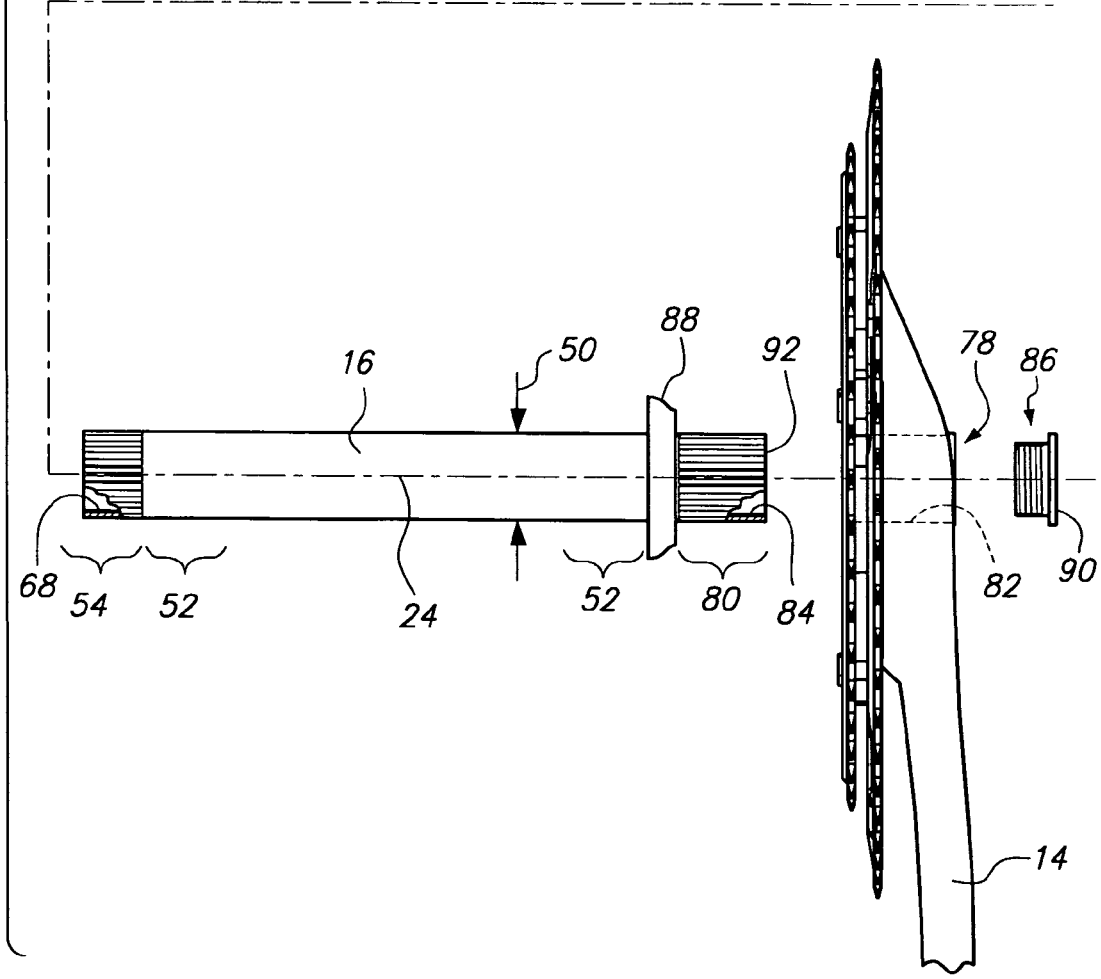

In another aspect of the bottom bracket assembly 10, the right crankarm 14 and the spindle 16 may be fabricated from separate components, as shown in FIG. 2. In particular, the right crankarm 14 may be removeably attachable to the spindle 16 via an aperture 78 of the right crankarm 14 sized and configured to fit over an opposed distal end portion 80 of the spindle 16. The opposed distal end portion 80 of the spindle 16 may be splined. Also, the internal surface 82 of the aperture 78 of the right crankarm 14 may be correspondingly splined such that the right crankarm 14 does not rotationally slip on the opposed distal end portion 80 of the spindle 16. The aperture 78 of the right crankarm 14 may be sized and configured to the opposed distal end portion 80 of the spindle 16 such that there is an appropriate fit (e.g., snug, friction, press, interference, etc.) between the aperture 78 and the opposed distal end portion 80. To ensure that the right crankarm 14 remains mounted on the opposed distal end portion 80 of the spindle, the opposed distal end portion 80 may be formed with internal threads 84. A locking screw 86 may be threaded onto the internal threads 84 of the opposed distal end portion 80. As the locking screw 86 is threaded into the internal threads 84 of the opposed distal end portion 80, the right crankarm 14 is held between a flange 88 of the spindle 16 and the head 90 of the locking screw 86. To this end, the distance between the flange 88 of the spindle 16 to an opposed distal end 92 of the spindle 16 may be less than a thickness of the right crank arm 14 such that the head 90 of the locking screw 86 contacts the right crankarm 14 before the locking screw 86 bottoms out.

It is also contemplated that the flange 88 and the locking screw 86 may be eliminated by pinning the right crankarm 14 onto the opposed distal end portion 80 of the spindle 16.

After the spindle 16 is mounted to the right crankarm 14, the spindle 16 may be inserted through the right compression collar 62, the right bearing 28, the bottom bracket shell 18, the left bearing 26, the left compression collar 60, and the optional dust cap 76. The distal end portion 54 of the spindle 16 protrudes out of the dust cap 76.

The left crankarm 12 is mounted onto the distal end portion 54 of the spindle 16 and the left and right bearings 26, 28 are preloaded thereby aligning the central axis 24 of the spindle 16 to the crankarm rotating axis 22. The left crankarm 12 is mounted onto the distal end portion 54 by inserting the distal end portion 54 into the split aperture 56 of the left crankarm 12. Thereafter, the cinching tool 66 is threaded into the internal thread 68 of the distal end portion 54. As the cinching tool 66 is threaded or tightened into the internal thread 68, the left crankarm 12 is drawn closer to right crankarm 14 thereby preloading the left and right bearings 26, 28. The cinching tool or adjustment screw 66 continues to tighten onto the spindle 16 until the left crankarm 12 and the right crankarm 14 does not wobble and yet does not bind when rotated. Once the appropriate amount of preload is applied to the left and right bearings 26, 28 the pinch bolt 58 is tightened thereby fixating the left crankarm 12 onto the distal end portion 54 of the spindle 16.

The right compression collar 62, the right bearing 28, the bottom bracket shell 18, the left bearing 26, the left compression collar 60, the dust cap 76, the left crankarm 12 and the adjustment screw 66 may have the same configuration as that discussed above in relation to the first embodiment of the bottom bracket assembly 10.

Figure 3:
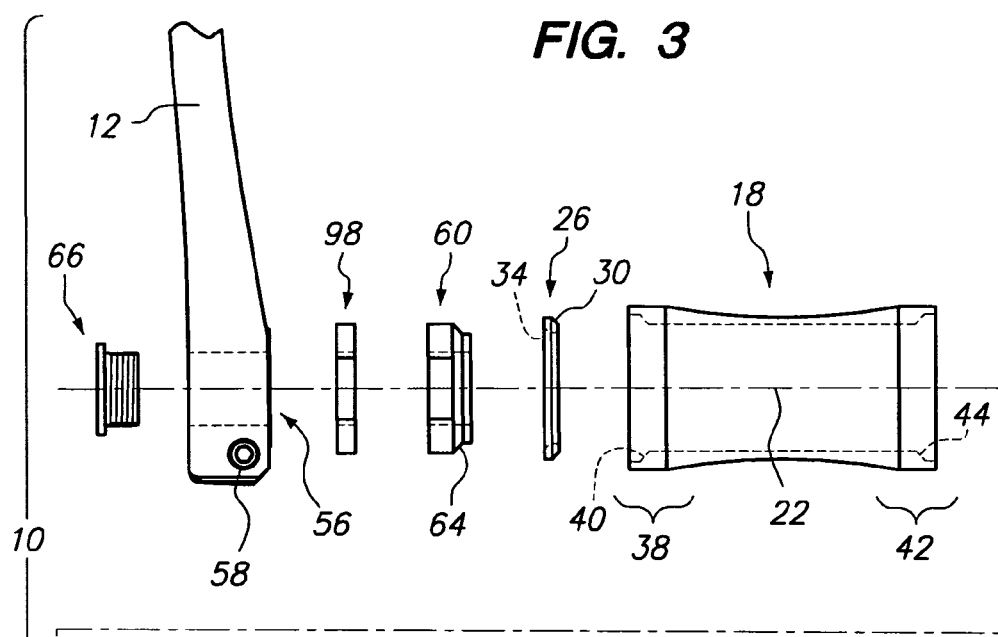
FIG. 3 is an exploded view of a second embodiment of a bicycle bottom bracket assembly.
Figure 3:
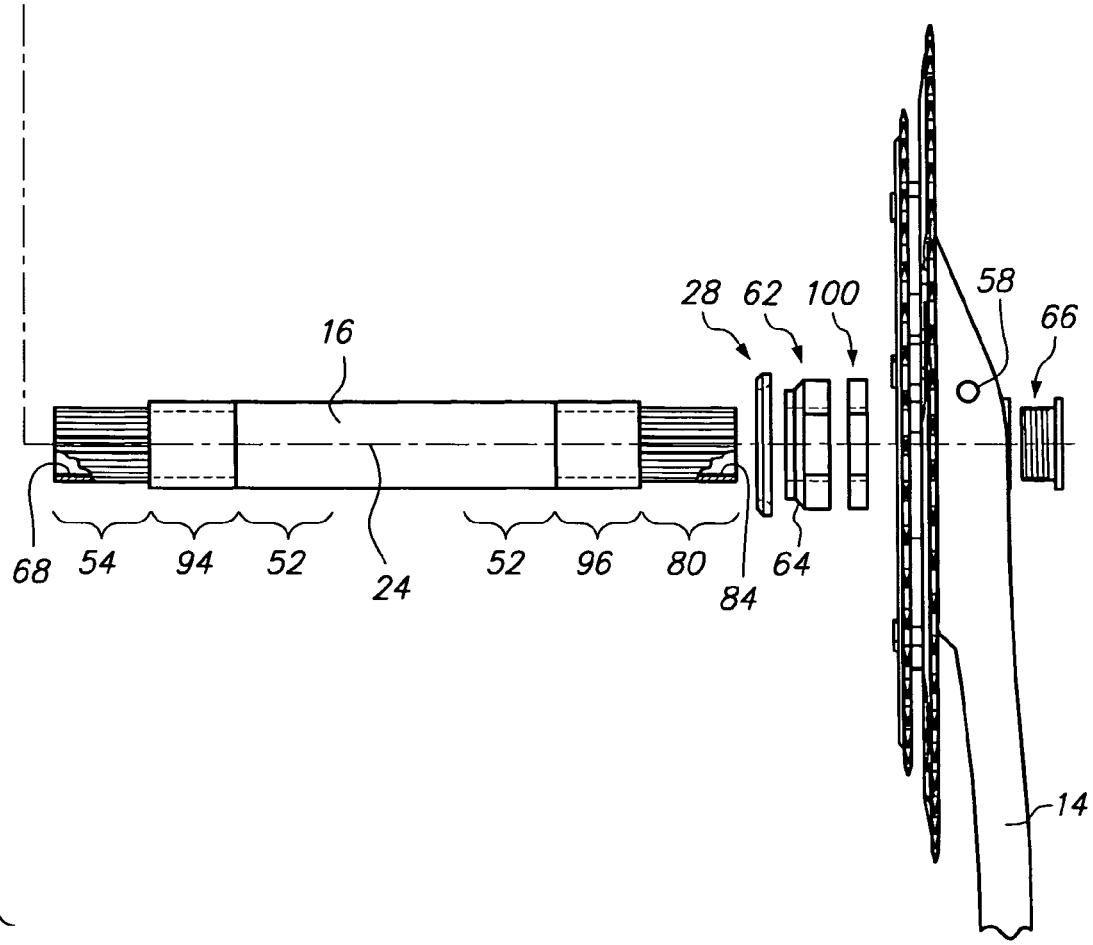

In a second embodiment of the bottom bracket assembly 10 shown in FIG. 3, the same 10 may comprise a bottom bracket shell 18 with a spindle 16 disposable therein. Left and right bearings 26, 28 may be mounted on the mounting surfaces 52 of the spindle 16. In particular, the spindle 16 may be inserted through a right jam nut 100, the right compression collar 62, the right bearing 28, the bottom bracket shell 18, the left bearing 26 and the left compression collar 60. The beveled surfaces 64, 34, 30, 40, 44 mate with each other to align the central axis 24 of the spindle 16 to the crank rotating axis 22 when the left and right bearings 26, 28 are preloaded.

To preload the left and right bearings 26, 28 onto the bottom bracket shell 18, the left and right compression collars 60, 62 may be internally threaded. The left compression collar may threaded onto the left threaded portion 94. The right compression collar 62 may be threaded onto the right threaded portion 96 of the spindle 16. The left and right compression collars 60, 62 are tightened onto the left and right threaded portions 94, 96 of the spindle 16 until the appropriate amount of preload is applied to the left and right bearings 26, 28. In particular, the left and right compression collars 60, 62 are tightened onto the left and right threaded portions 94, 96 of the spindle 16 until the central axis 24 of the spindle 16 is aligned to the crankarm rotating axis 22 (i.e., the left and right crankarms 12, 14 do not wobble) yet the spindle 16 does not bind when rotated. To ensure that the left and right compression collars 60, 62 do not become loose while the rider is riding his or her bicycle, the left and right jam nuts 98, 100 may be threaded onto the left and right threaded portions 94, 96 of the spindle 16. The left and right jam nuts 98, 100 may be tightened onto the left and right compression collars 60, 62 to ensure that the left and right compression collar 60, 62 do not become loose while the rider is riding his/her bicycle.

The left and right crankarms 12, 14 may be mounted onto the distal end portion 54 and the opposed distal end portion 80 of the spindle 16 via methods known in the art, developed in the future or described herein. By way of example and not limitation, the distal end portion 54 of the spindle 16 may be splined. The left crankarm 12 and more particularly the split aperture 56 of the left crankarm 12 may also be splined. The distal end portion 54 of the spindle 16 may be inserted into the split aperture 56 of the left crankarm 12. Due to the splined nature of the left crankarm 12 and the spindle 16, the left crankarm 12 does not rotationally slip about the spindle 16. To ensure that the left crankarm 12 is butted up against the left jam nut 98, an adjustment screw 66 may be threaded into internal threads 68 of the distal end portion 54. The adjustment screw 66 ensures that the left crankarm 12 does not slip out of the distal end portion 54 of the spindle 16. To further lock the left crankarm 12 onto the spindle 16, the pinch bolt 58 may be tightened so as to frictionally engage the split aperture 56 to the distal end portion 54 of the spindle 16. Alternatively, the left crankarm 12 may be pinned to the distal end portion 54 of the spindle 16. Similarly, the right crankarm 14 may be attached to the opposed distal end portion 80 of the spindle 16 in the same manner as discussed in relation to the left crankarm 12.

In an aspect of the bottom bracket shell 10, it is also contemplated that the spindle 16 and the right crankarm 14 be fabricated or joined to each other so as to be a unitary member. The left crankarm 12 may be removeably attachable to the opposed distal end portion 80 of the spindle 16.

In an aspect of the bottom bracket shell 10, the left and right compression collars 60, 62 are optional. When the left and right compression collars 60, 62 are used, they 60, 62 may be continuous to form a complete circle. Alternatively, the left and right compression collars 60, 62 may be split (see left compression collar 60 of FIG. 1) such that the inner diameter of the left and right compression collars 60, 62 reduces as the bearing preload is applied to the left and right bearings 26, 28. By way of example and not limitation, the compression collars 60, 62 shown in FIG. 1 may be split and may operate as follows. The compression collars 60, 62 shown in FIGS. 2 and 3 may also be split and operate in the same manner. Referring to compression collars 60, 62 of FIG. 1, the spindle may be inserted through the right compression collar 62, the right bearing 28, the bottom bracket shell 18, the left bearing 26, the left compression collar 60, and the aperture 56 of the left crankarm 12. The adjustment screw 66 may be threadingly engaged to the internal threads 68 of the distal end portion 54 of the spindle 16. The adjustment screw 66 is tightened to preload the bearings 26, 28. Simultaneously, the second internal beveled surfaces 34 of the left and right bearings 26, 28 contacts the second beveled surfaces 64 of the compression collars 60, 62. This contact reduces the inner diameter of the compression collars 60, 62 such that the inner surface of the compression collars 60, 62 clamps down on the spindle. Such contact further assists in the elimination of any play or wobble in the spindle 16.

The above description is given by way of example, and not limitation. Given the above disclosure, one skilled in the art could devise variations that are within the scope and spirit of the invention disclosed herein. Further, the various features of the embodiment is disclosed herein can be used alone, or in varying combinations with each other and are not intended to be limited to the specific combination described herein. Thus, the scope of the claims is not to be limited by the illustrated embodiments.

What is claimed is:

1. A bicycle comprising:
a left bearing having a first beveled surface;
a right bearing having a first beveled surface;
a frame including a bottom bracket shell, the bottom bracket shell defining a crank rotating axis, a left side portion and a right side portion, the left side portion of the bottom bracket shell having a first beveled surface sized and configured to receive the first beveled surface of the left bearing, the right side portion of the bottom bracket shell having a first beveled surface sized and configured to receive the first beveled surface of the right bearing;
a spindle disposable through the bottom bracket shell, the left bearing and the right bearing, the spindle defining a central axis;
a right crankarm attached to the right side portion of the spindle;
a left crankarm attached to the left side portion of the spindle;
wherein the left and right bearings are pre-loaded such that the left bearing first beveled surface contacts the first beveled surface of the shell left side portion and the right bearing first beveled surface contacts the first beveled surface of the shell right side portion thereby aligning the central axis of the crankshaft to the spindle central axis, the left and right bearings being pre-loaded to an extent that the left and right crankarms do not bind or wobble when rotated.

2. The bicycle of claim 1 further comprising a cinching tool including a threaded post, and wherein the left side portion of the spindle has a threaded hole for receiving the threaded post, the cinching tool applying pressure to the left bearing for preloading the left and right bearings and aligning the central axis of the spindle to the crank rotating axis when the threaded post of the cinching tool is threaded and tightened into the threaded hole of the crankshaft left side portion.

3. The bicycle of claim 2 useable with a crank/spindle assembly where the separation of the cranks can be adjusted, independently of the mechanism which locates the cranks to the spindle such that the pressure on the bearings can be adjusted to aligning the central axis of the spindle to the crank rotating axis before the crank arms are fixed to the spindle.

4. The bicycle of claim 1 wherein the left and right bearings are angular contact bearings.

5. The bicycle of claim 1 wherein the right crankarm is unitary with the spindle.

6. The bicycle of claim 1 wherein the left crankarm is unitary with the spindle.

7. The bicycle of claim 1 wherein the right crankarm is removeably attachable to the spindle.

8. The bicycle of claim 1 wherein the left crankarm is removeably attachable to the spindle.

9. The bicycle of claim 1 further comprising a dust cover disposed between the left crankarm and the left bearing, the dust cover covering the left bearing for preventing dust from entering into the left bearing.

10. The bicycle of claim 1 further comprising a dust cover disposed between the right crankarm and the right bearing, the dust cover covering the right bearing for preventing dust from entering into the right bearing.

11. The bicycle of claim 1 further comprising a left compression collar disposed between the left crankarm and the left bearing and a right compression collar disposed between the right crankarm and the right bearing.

12. The bicycle of claim 11 wherein a second beveled surface of the left bearing contacts a second beveled surface of the left compression collar and a second beveled surface of the right bearing contacts a second beveled surface of the right compression collar for aligning the central axis of the crankshaft to the spindle central axis.

13. A bicycle comprising:
a left bearing having a first beveled surface;
a right bearing having a first beveled surface;
a frame including a bottom bracket shell, the bottom bracket shell defining a crank rotating axis, a left side portion and a right side portion, the left side portion of the bottom bracket shell having a first beveled surface sized and configured to receive the first beveled surface of the left bearing, the right side portion of the bottom bracket shell having a first beveled surface sized and configured to receive the first beveled surface of the right bearing;
a spindle disposable through the bottom bracket shell, the left bearing and the right bearing, the spindle defining a central axis;
right and left crankarms respectively attached to the right and left side portions of the spindle, one of the right and left crankarms permanently secured to the respective right and left side portions of the spindle, the other one of the right and left crankarms removeably secured to the right and left side portions of the spindle;
wherein the left and right bearings are pre-loaded such that the left bearing first beveled surface contacts the first beveled surface of the shell left side portion and the right bearing first beveled surface contacts the first beveled surface of the shell right side portion thereby aligning the central axis of the crankshaft to the spindle central axis, the left and right bearings being pre-loaded to an extent that the left and right crankarms do not bind or wobble when rotated.

14. A bicycle comprising:
a left bearing having a first beveled surface and a second beveled surface;
a right bearing having a first beveled surface and a second beveled surface;
a frame including a bottom bracket shell, the bottom bracket shell defining a crank rotating axis, a left side portion and a right side portion, the left side portion of the bottom bracket shell having a first beveled surface sized and configured to receive the first beveled surface of the left bearing, the right side portion of the bottom bracket shell having a first beveled surface sized and configured to receive the first beveled surface of the right bearing;
a spindle disposable through the bottom bracket shell, the left bearing and the right bearing, the spindle defining a central axis;
right and left crankarms attached to the right and left side portions of the spindle;
left and right split compression collars disposed between the left and right bearing and the left and right crankarms, the left and right split compression collars having second beveled surfaces;
wherein the left and right bearings are pre-loaded such that the first beveled surfaces of the left bearing and the shell left side portion contact each other, the first beveled surfaces of the right bearing and the shell right side portion contact each other, the second beveled surfaces of the left bearing and the left compression collar contact each other and the second beveled surfaces of the right bearing and the right compression collar contact each other thereby aligning the central axis of the crankshaft to the spindle central axis, the left and right bearings being pre-loaded to an extent that the left and right crankarms do not bind or wobble when rotated.

15. The bicycle of claim 14 wherein the left and right split compression collars are pressed against the spindle when the left and right bearings are pre-loaded to mitigate against wobbling of the spindle.

16. The bicycle of claim 14 wherein diameters of the left and right split compression collars are reduced when the left and right bearings arc pre-loaded to mitigate against wobbling of the spindle.

* * * * *